INVENTOR.
BY CECIL FRANKLIN

United States Patent Office 3,217,243
Patented Nov. 9, 1965

3,217,243
ELECTRONIC APPARATUS FOR TESTING THE CONTACT RESISTANCE OF ELECTROMAGNETIC RELAYS
Cecil Franklin, Vergennes, Vt., assignor to Simmonds Precision Products, Inc., Tarrytown, N.Y., a corporation of New York
Filed Oct. 1, 1962, Ser. No. 227,287
8 Claims. (Cl. 324—28)

This invention relates to a relay tester and particularly relates to a relay tester which monitors the contact resistance of the relay under test, and provides an indication if and when this resistance is in excess of a pre-determined value.

The need frequently arises for the testing of relay failures under dry conditions. Frequently, the failures have been found to be caused by the relay contacts intermittently exhibiting a high contact resistance, and in view of the nature of this defect the faulty relays have been difficult to find by normal test methods.

Further, since many of the relays in such applications function in a manner such that their contacts close before current is applied thereto it is necessary for the relays to be tested under similar conditions in order to ascertain their true performance.

In addition in the case of relays having a sealed envelope, even when previously unused, they can become troublesome in later use if they have been stored for some time since the contacts there have been known to become contaminated by the gassing of matter within their envelopes.

It is an object of this invention to provide a relay tester which rapidly performs a number of repetitive test operations to ensure whether or not a relay is serviceable.

It is a further object of this invention to provide a relay tester which monitors the contact resistance of a relay under test, in conditions in which the resistance of the closed contacts is monitored a pre-determined time after the closure of these contacts.

It is a further object of this invention to provide a relay tester having means for indicating any relay the contacts of which exhibit a contact resistance in excess of a predetermined value.

It is a further object of this invention to provide a relay tester which accommodates a plurality of relays and simultaneously performs testing operations on all the relays, the indication of a fault in one or some of the relays causing the test operations to be continued uninterrupted on the remaining relay or relays.

It is a further object of this invention to provide a relay tester adapted to accommodate different types of relays, relays of the same type being tested at any one time.

Figure 1:
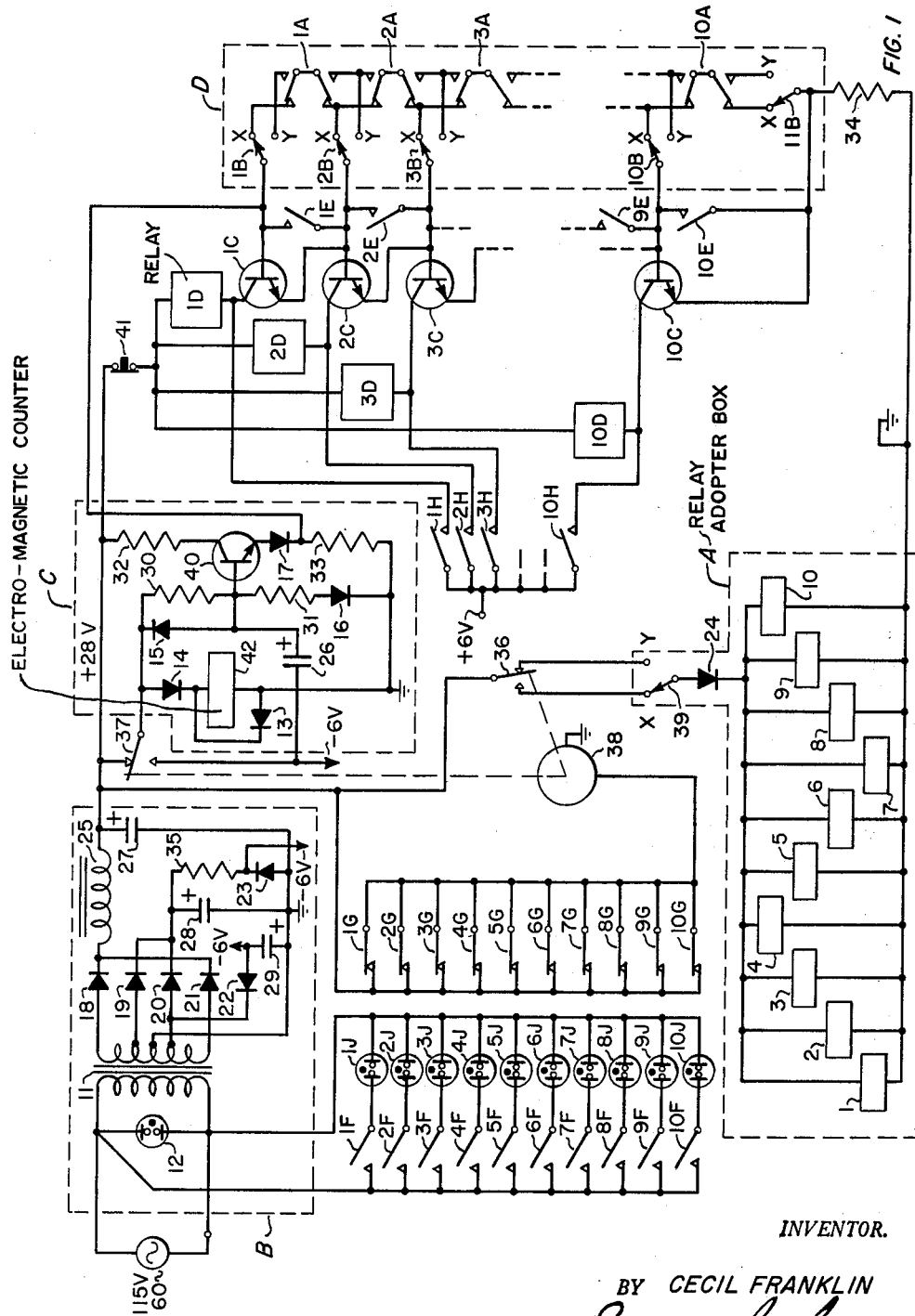
Figure 2:
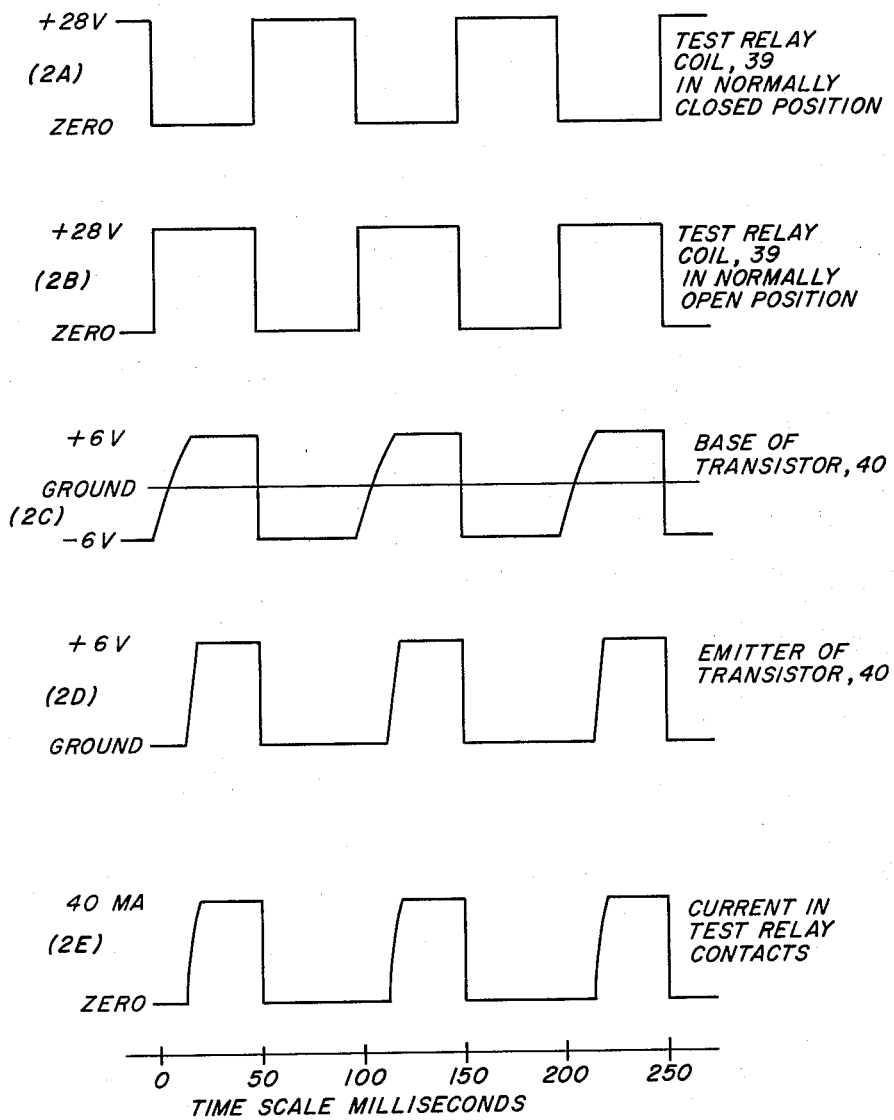

These and other objects of the invention will become apparent from the following description of a preferred embodiment of the invention with reference to the accompanying drawings, in which:

FIGURE 1 illustrates a circuit diagram of a relay tester according to the invention; and FIGURE 2 illustrates graphically voltage and current values at various points in the above circuit plotted against a time scale.

Referring now to FIGURE 1, the relay tester includes a detachable adaptor A for accommodating 10 relays of any one type. The adaptor A is internally wired in such a manner that when the relays are connected thereto the energizing coils 1 through 10 inclusive of these relays are connected together in parallel with each other and the movable contacts thereof 1A through 10A inclusive are connected in a series chain.

The tester includes a power supply section B comprising a main transformer 11 having a primary winding across which is connected an indicator lamp 12 and a center-tapped secondary winding connected to ground. Two rectifiers 18 and 21 together with the center tapped secondary winding of transformer 11 form a full wave rectifier. Choke 25 is connected between the junction of these rectifiers and a smoothing capacitor 27, this capacitor and the choke 25 constituting a choke input filter from which a 28 volt D.C. supply is obtained.

Two rectifiers 19 and 20 are connected to intermediate taps on the secondary winding on opposite sides of the center-tap, and the rectified voltage therefrom is smoothed by a capacitor 28 across which lies a series connected resistor 35 and a zener diode 23. A 6 volt regulated bias voltage is thus obtained from the junction between 35 and 23. An unregulated bias voltage 6 volts negative to earth, is obtained from the junction between a rectifier 22 and a capacitor 29 which are connected together in series across one of the intermediate taps and the center-tap of the secondary winding.

The 28 volt supply is fed to the energizing coils 1 through 10 inclusive through a motor-controlled microswitch 36, a control selector 39 switch having contacts X, Y, and a rectifier 24. A further motor controlled micro-switch 37 is connected to a delay and current-control circuit C and is adapted to connect to the input thereof either the 28 volt supply or the 6 volt negative unregulated bias. The operation of the micro-switches 36 and 37 and the contact selectors 1B through 11B inclusive will be particularly described hereinafter.

The circuit C comprises a transistor 40 the base of which is connected to a potential divider 30 and 31, 16. A capacitor 26 lies between the junction of resistors 30, 31 and the 6 volt negative bias, and a rectifier 15 is connected across the resistor 30 to govern the charge and discharge path for this capacitor.

An electro-magnetic counter 42 for counting the number of test operations effected on the relays is connected to the micro-switch 37 through a diode 14, a diode 13 being connected across the energizing coil of this counter to damp any self-oscillation of this coil.

The collector of the transistor 40 is connected to the 28 volt supply through a resistor 32 and the switch circuit of this transistor, from which the input is taken, includes a series connected rectifier 17 and a resistor 33.

The output of the transistor 40 is connected to the input (base) of a transistor amplifier 1C which constitutes the first of a chain of cascade connected transistor amplifiers 1C through 10C inclusive. The collectors of these transistor amplifiers 1C through 10C inclusive are respectively connected to the energizing coils of lock-out relays 1D through 10D inclusive, each of which coils is connected to the 28 volt supply through a common reset button 41.

One contact, 1E, 2E through 10E inclusive of the lockout relays is respectively connected across the emitter to base path of the transistor amplifiers 1C, 2C through 10C inclusive, the emitter of the last transistor 10C in the chain being connected to ground through a resistor 34.

Contact selector switches 1B through 11B inclusive are respectively connected to the base connections of the transistors 1C through 10C inclusive, and two contacts X, Y, are associated with each of these switches.

The contacts of the relays to be tested, 1A through 10A inclusive area connected in series in such a manner that a continuous conductive path is provided when the said contacts are all "normally open" and when the contacts are all "normally closed." In the drawing the latter contacts are shown to be all "normally closed," that is they are all connected to the contact X of the two contacts associated with the contact selector switches 1B through 11B inclusive. Thus, in dependence on the position of these contact selector switches, the controlled current output from the transistor 40 flows through all the relay contacts when they are closed; that is, for the case shown, when the associated relays are de-energized and, for the "normally open" case (not shown) when the relays are energized.

The lock-out relays 1D through 10D inclusive have contacts 1E through 10E inclusive, respectively associated therewith and adapted to be closed upon energization of these relays to apply the 6 volt bias supply to the energizing coils of these relays and complete a hold circuit therefor.

In addition, each of the lock-out relays includes a contact 1G through 10G inclusive, each of which is normally closed to connect the 28 volt supply to drive the motor controlling the micro-switches 36, 37, and a contact 1F through 10F inclusive respectively connected to a fault lamp 1J through 10J inclusive across the primary of the transformer 11. The contacts 1F through 10F inclusive, are normally open and thus their associated fault lamps are extinguished.

In one relay tester constructed in accordance with the invention the above mentioned components were of the type and value listed below.

| 13, 14 | IN 2069 | 30 | 27K. |
|---|---|---|---|
| 15, 22 | IN 645 | 31 | 15K. |
| 23 | SV 3045 | 32, 34 | 150 ohms. |
| 24 | IN 645 | 33 | 1K. |
| 25 | 0-15H/1A | 35 | 50 ohms 5W. |
| 26 | 15 mfd | 40 | 2N497. |
| 27 | 2,000 mfd | 1C-10C | J595. |
| 28, 29 | 500 mfs | | |

In describing the operation of the relay tester, it will be initially assumed that the relays to be tested have "normally open" contacts. Thus, the contact selector switches 1B through 11B inclusive, 39 will be in a position coupling the contact Y thereof, that is, opposite to the position shown in FIGURE 1.

The rotation of the motor 38 causes the cam-operated micro-switches 36 and 37 to change-over in a pre-determined sequence in 100 millisecond "cycles" as shown in FIGURES 2A and 2B. When the switch 36 is moved into the position illustrated in FIGURE 1 at the instant "0" in FIGURE 2 the coils to all the relays 1 through 10 inclusive are energized simultaneously and their associated contacts 1A through 10A inclusive, close. Switch 37 also moves at this time into the position illustrated and applies 28 volts D.C. to the base supply network of transistor 40 and charges the capacitor 26 through the resistor 30. The base voltage thus rises exponentially from 6 volts negative, at which it was previously held, to 6 volts positive determined by the circuit constants, as shown in FIGURE 2C. The transistor 40 remains cut-off until the voltage rises above 0.5 volts positive after which the emitter voltage rapidly rises to the 6 volts positive value, as shown in FIGURE 2D.

This delay in the operation of the transistor 40 is approximately 12 milliseconds in a 50 millisecond half-cycle and permits the relay contacts to close and stop bouncing before the test current is applied thereto. The relay contacts close in a "dry" state, that is, virtually no current passes through these contacts at the instant of closure.

The current flowing in the output (emitter) circuit of the transistor 40 is shown in FIGURE 2E; this current rapidly rises to a preset value when the transistor conducts and flows through the relay contacts for 38 milliseconds, that is, the remaining period in each half-cycle, before the micro-switches 36 and 37 change-over.

When the micro-switches 36 and 37 change-over the coils in the test relays are de-energized and 26 discharges through the rectifier 15 and the micro-switch 37. The circuit remains in this state for the following 50 millisecond half-cycle after which the train of events is repeated.

Referring now more particularly to the relay contact circuits, if the contact resistance of the two series connected contacts in any one relay is very small then the base-emitter electrodes in its associated transistor amplifier are effectively short-circuited thereby. However, should there be a contact resistance of more than about 30 ohms across these relay contacts during the flow of current therethrough, then the voltage drop across these contacts, which is actually resistance multiplied by current, produces a base emitter current. This current is then amplified and produces a collector current of significant magnitude to operate the relay. Thus, should the lockout relay 1D become energized, then contact 1E would short-circuit the series connected contacts of the relay 1, contact 1H would close to apply a 6 volt positive supply to the relay 1D and complete a hold circuit therefor, contact 1G would open in the motor supply circuit, and contact 1D would close and cause its associated fault lamp 1J to be illuminated to provide a visual indication that the contact resistance of the relay 1 is unsatisfactory.

The testing process on the remainder of the relays is unaffected by the removal of a faulty relay from the circuit. Only when all the relays have been found to be faulty will the testing process be stopped automatically since in such a case the supply to the motor will be broken. All the fault lamps will remain illuminated in this case.

A relay contact need exhibit a high resistance for only a few milliseconds during any one cycle for its associated lock-out relay to be energized and the faulty relay visually indicated.

The reset button 41 breaks the supply to the lock-out relays and permits the re-testing of the relays.

For the case in which the relays tested have "normally closed" contacts the control selector switches will be in a position coupling the contact X thereof, that is in the position shown in FIGURE 1, and the current output from transistor 40 will be applied to the relay contacts 12 milliseconds after the relays have been de-energized.

In the embodiment illustrated the contacts of each of 10 relays are opened and closed 10 times per second, thus a test run of 3000 operations may be conducted in five minutes.

While there has been described what is at present considered to be a preferred embodiment of the invention, it will be obvious to those skilled in the art that various changes and modifications may be made therein within the scope of the appended claims without departing from the scope and spirit of the invention.

I claim:
1. An electro-magnetic relay test set for simultaneously testing a number of electro-magnetic relays, each relay having an energizing coil, a stationary contact and a movable contact which is movable by energization of said coil to engage with said stationary contact to complete a conductive path between said movable contact and said stationary conduct, comprising
    first electrical connections for electrically connecting the energizing coils of the relays in parallel,
    second electrical connections for electrically connecting all the contacts of the relays in series whereby said contacts close upon energization of said coils,
    an electrical supply source,
    a plurality of further electro-magnetic relays equal in number to the maximum number of relays which may be tested, each of said further relays having an energizing coil, three pairs of normally open contacts and one pair of normally closed contacts, said normally closed contacts being electrically connected in parallel with one another,
    a plurality of electrically operated indicators, each of said indicators being connectable to said supply source by a respective first one of said three pairs of normally open contacts upon energization of its associated further relay,
    cyclically operable motor means connected to said supply source through said parallel-connected normally closed contacts of said further relays, said motor means having first and second pairs of contacts which are cyclically operated in synchronism, said parallel-connected relay energizing coils being electrically connected to said supply source through the first pair of contacts of said motor means, a constant current source for said series-connected relay contacts, said second pair of contacts of said motor means cyclically feeding said current to said series connected relay contacts a pre-determined time after energization of said relay coils, a plurality of transistors, equal in number to the maximum number of relays which may be tested, each transistor having an emitter electrode, a base electrode and a collector electrode, the conductive path of each relay being tested being connected between said base electrode and said emitter electrode, each of the energizing coils of said further electro-magnetic relays being electrically connected between the collector of a respective one of said transistors and said supply source whereby, if the resistance of the conductive path of a relay being tested exceeds a pre-determined value, the transistor connected to said path is rendered conductive and the associated further electro-magnetic relay is energized, the second one of said three pairs of normally-open contacts thereof being electrically connected to the energizing coil of their relay and to said supply source to form a holding circuit for the relay upon energization thereof, and the third one of said three pairs of normally open contacts of said associated relay being electrically connected between the base electrode and the emitter electrode upon energization thereof whereby the conductive path of said relay being tested is by-passed.

2. An electro-magnetic relay test set for simultaneously testing a number of electro-magnetic relays, each relay having an energizing coil, a stationary contact and a movable contact which is movable in response to energization of said coil to disengage from said stationary contact, and is movable in response to de-energization of said coil to engage with said stationary contact to complete a conductive path between said movable contact and said stationary contact, comprising first electrical connections for electrically connecting the energizing coils of the relays in parallel, second electrical connections for electrically connecting all the contacts of the relays in series whereby said contacts close upon de-energization of said coils, an electrical supply source, a plurality of further electro-magnetic relays equal in number to the maximum number of relays which may be tested, each of said further relays having an energizing coil, three pairs of normally open contacts and one pair of normally closed contacts, said normally closed contacts being electrically connected in parallel with one another, a plurality of electrically operated indicators, each of said indicators being connectable to said supply source by a respective first one of said three pairs of normally open contacts upon energization of its associated further relay, cyclically operable motor means connected to said supply source through said parallel-connected normally close contacts of said further relays, said motor means having first and second pairs of contacts which are cyclically operated in synchronism, said parallel-connected relay energizing coils being electrically connected to said supply source through the first pair of contacts of said motor means, a constant current source for said series-connected relay contacts, said second pair of contacts of said motor means cyclically feeding said current to said series-connected relay contacts a pre-determined time after de-energization of said relay coils, a plurality of transistors, equal in number to the maximum number of relays which may be tested, each transistor having an emitter electrode, a base electrode and a collector electrode, the conductive path of each relay being tested being connected between said base electrode and said emitter electrode, each of the energizing coils of said further electro-magnetic relays being electrically connected between the collector of a respective one of said transistors and said supply source whereby if the resistance of the conductive path of a relay being tested exceeds a pre-determined value the transistor connected to said path is rendered conductive and the associated further electro-magnetic relay is energized, the second one of said three pairs of normally-open contacts thereof being electrically connected to the energizing coil of their relay and to said supply source to form a holding circuit for the relay upon energization thereof, and the third one of said three pairs of normally open contacts of said associated relay being electrically connected between the base electrode and the emitter electrode upon energization thereof whereby the conductive path of said relay being tested is by-passed.

3. An electro-magnetic relay test set for simultaneously testing a number of electro-magnetic relays, each relay having an energizing coil, two stationary contacts and a movable contact which is movable in response to energization and de-energization of said coil to engage alternatively with different ones of said two stationary contacts and complete a conductive path between said movable contact and said different ones of the stationary contacts, comprising first electrical connections for electrically connecting the energizing coils of the relays in parallel, second electrical connections for electrically connecting in series all the contacts of the relays between said movable contact and one of said stationary contacts, manually operable switch means having a first movable contact movable to engage alternately with different ones of two further stationary contacts, and second movable contacts each movable to engage alternately with different ones of said two stationary contacts of said relays whereby each of said series-connected relay contacts is connected between two of said second movable contacts when all of said second contacts engage with said one of the stationary contacts of said relays, an electrical supply source, a plurality of further electro-magnetic relays equal in number to the maximum number of relays which may be tested, each of said further relays having an energizing coil, three pairs of normally open contacts and one pair of normally closed contacts, said normally closed contacts being electrically connected in parallel with one another, a plurality of electrically operated indicators, each of said indicators being connectable to said supply source by a respective first one of said three pairs of normally open contacts upon energization of its associated further relay, cyclically operable motor means connected to said supply source through said parallel-connected normally closed contacts of said further relays, said motor means having one movable contact to engage alternately with said two further stationary contacts, said parallel-connected relay energizing coils being electrically connected to and energized by said supply source when said cyclically operable movable contact engages with the further stationary contact with which the said first manually movable contact is engaged, said cyclically operable motor means having another movable contact operable in synchronism with said one movable contact to engage and disengage, alternately, with a stationary contact, a constant current source for said second movable contact connected to one of said series-connected relay contacts, said current being fed to said relay contacts when said other cyclically operable movable contact engages with said stationary contact at a pre-determined time after energization of said relay coils, a plurality of transistors, connected in cascade and equal in number to the maximum number of relays which may be tested, each transistor having an electrode connected to said source of supply through the energizing coil of an associated one of said further relays, an input electrode and an input electrode, the conductive path of each relay being tested being connected between said input electrode and said output electrode when said second movable contacts engage with said one of the stationary contacts of the relays, whereby, if the resistance of one of the series-connected conductive paths exceeds a pre-determined value the transistor connected to said path is rendered conductive and the associated further electro-magnetic relay is energized, the second one of said three pairs of normally-open contacts thereof being electrically connected to the energizing coil of their relay and to said supply source to form a holding circuit for the relay upon energization thereof, and the third one of said three pairs of normally open contacts of said associated relay being electrically connected between the input electrode and the output electrode upon energization thereof whereby the said one of the series-connected conductive paths is short-circuited.

4. An electro-magnetic relay test set as claimed in claim 3, further comprising a controlled-current delay circuit having an input and an output, said electric current of a pre-determined value being derived from said delay circuit, said input of the delay circuit being connected to said electrical supply source through said other cyclically operable movable contact when said movable contact engages with its said stationary contact and the output of said delay circuit being connected to the said second movable contact connected to the initial one of said series-connected conductive paths.

5. An electro-magnetic relay test set as claimed in claim 4, said delay circuit comprising two stationary contacts, said other cyclically operable movable contact engaging alternately with said two contacts, a capacitor connected between one of said two stationary contacts and said other movable contact, the other stationary contact being connected to said electrical supply source, a transistor having one electrode connected to said electrical supply source, one input electrode connected to said other movable contact and an output electrode connected to said second movable contact, said capacitor changing towards the potential of said supply source when said other movable contact engages with said other stationary contact, said transistor producing said controlled current output when said change reaches a pre-determined value.

6. An electro-magnetic relay test set as claimed in claim 5, wherein said cyclically operable switch areas comprises a motor having cam means for operating said one and said other movable contacts.

7. An electro-magnetic relay test set as claimed in claim 6, further comprising a counter for counting the number of times the coils of the relays being tested are energized.

8. A test set for electro-magnetic relays comprising a circuit unit for receiving $n$ test relays each having an energizing coil and contacts movable between two positions, said circuit unit including electrical connections connecting all the coils of said relays in parallel with each other and all the contacts of said relays in series with each other when said contacts all lie in one of said positions and when said contacts all lie in the other of said positions, a first switch having $n+2$ movable contacts, one of said contacts being connected in common with all the said coils and movable between first and second positions, and $n+1$ of said contacts being movable between the two positions of said test relay contacts, each one of said relay contacts being connected between two of said switch contacts, a source of electrical supply for producing a first, a second and a third voltage, $n$ indicator elements connected to, and operated by, said source of supply, an electrical motor connected to said first voltage supply source, a second switch connected to said first voltage source having two movable contacts simultaneously operated by the motor, one of said contacts being alternately movable between the first and second positions of said one contact of the first switch to energize and de-energize, alternately, the coils of all the test relays connected thereto, and $n$ relay contacts having movable between said two positions thereof in response to said energization and de-energization, a delay circuit for producing a controlled current output and having an input circuit and an output circuit, said input circuit being connected to the other of the two movable contacts of the second switch, the said other contact alternately connecting the first voltage source, and the second value of voltage source to said input circuit, the controlled current output being produced by said delay circuit a pre-determined period after the connection of the first voltage source to said input and maintained until the second voltage source is connected to said input, $n$ transistors connected in cascade, each of said transistors having one electrode connected to said first voltage source, an input electrode and an output electrode, the output of said delay circuit being connected to the input electrode of an initial one of said cascade connected transistors, the said contacts of the $n$ test relays being respectively connected between the input and output electrodes of said $n$ transistors, and to the output of said delay circuit, in one position of said first switch, $n$ electro-magnetic control relays each having an energizing coil and four contacts, the coils of said $n$ control relays being respectively connected between the said one electrodes of the $n$ transistors and the said first value of voltage, a first one of said control relay contacts being connected across the relay contacts of an associated one of said $n$ test relays and movable between first and second positions to produce an open circuit and a short circuit, respectively, across the contacts of said associated test relays, a second one of said control relay contacts being connected between the coil of its associated control relay and the third voltage source, and movable between first and second positions to disconnect and connect, respectively, said third voltage source to said coil, a third one of said control relay contacts being connected between said motor and said first voltage source and movable between first and second positions to connect and disconnect, respectively, said first voltage source to said motor, a fourth one of said control relay contacts being connected between said source of supply and an associated one of said $n$ indicator elements and movable between first and second positions to disconnect and connect, respectively, said indicator element to said source of supply, any one of said control relay coils being energized in response to the test relay contacts connected in said one position of said first switch exhibiting a resistance in excess of a pre-determined value to the passage therethrough of said controlled current, four contacts of the said control relay being movable from said first to said second position in response to said energization and the control relay coil being held energized in response to the movement of its second contact from said first to said second position.

References Cited by the Examiner

UNITED STATES PATENTS 2,833,983  5/58  Shaw _____ 324—28
3,128,426  4/64  Swinehart _____ 324—28

FREDERICK M. STRADER, *Primary Examiner.*

WALTER L. CARLSON, *Examiner.*